Patented Jan. 25, 1944

2,339,787

UNITED STATES PATENT OFFICE 2,339,787

SUBSTITUTED PARA-AMINOBENZENE SULPHONAMIDE COMPOUND

John Lee, Clifton, N. J., assignor to Hoffmann-La Roche, Inc., Nutley, N. J., a corporation of New Jersey No Drawing. Application May 16, 1936, Serial No. 80,138

2 Claims. (Cl. 260—397.7)

The present invention has for its object the provision of substituted para-aminobenzene compounds having properties rendering them suitable for use in animal therapy, especially of compounds adapted for use as general internal antiseptics against bacterial infections in the higher animal organisms, and more particularly of compounds which are non-toxic to human beings and are highly effective against streptococci.

I have found that by combining compounds of the para-aminobenzenesulphonamide type, that is, para-aminobenzenesulphonamide and certain of its substitution products, with formaldehyde sodium bisulphite, therapeutically valuable substances are obtained which act as efficient internal antiseptics in the treatment of such diseases as scarlet fever, puerperal fever, erysipelas, pus infections, infections of the genito-urinary tract, and coccus infections generally. The compounds are neutral, non-irritating, and practically non-toxic and can be used in relatively large doses without ill effects.

The compounds produced by me have the general formula

wherein R may be either hydrogen or a hydrocarbon radical such as the methyl radical, and R' may be hydrogen or an alkyl (such as methyl or ethyl) radical.

The invention will be further described in the following examples which are presented by way of illustration only and not as indicating the limits of the invention:

*Example 1*

172 parts of para-aminobenzenesulphonamide are mixed with 500 parts of warm water, 104 parts of sodium bisulphite and 73 parts of 41% formaldehyde solution, the proportions of the reacting compounds being substantially equimolecular. The mixture is heated on the water bath until on cooling no precipitation of para-aminobenzenesulphonamide occurs, which shows that the reaction is complete. Heating for 1 to 2 hours, depending upon the temperature, is sufficient. The solution is filtered and then evaporated to dryness. The residue is extracted with alcohol, sucked on the Buchner funnel, and then washed with alcohol and dried. The product is sodium para-sulphonamidobenzeneaminomethanesulphonate having a composition corresponding to the structural formula

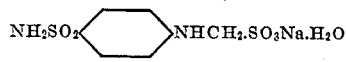

If desired, a slight excess, say 10%, of the para-aminobenzenesulphonamide may be employed to insure complete reaction with the formaldehyde sodium bisulphite. Two hours' heating on the water bath will be sufficient to insure complete reaction. The excess of starting material will, of course, make it impossible to judge the completion of the reaction solely by the precipitation of para-aminobenzenesulphonamide on cooling the reaction solution, but the use of an excess of such compound has the advantage that it insures the complete binding of the formed formaldehyde sodium bisulphite. The excess para-aminobenzenesulphonamide can be readily removed with alcohol, the compound not being soluble in water, whereas formaldehyde sodium sulphite, like the desired end product, is soluble in water and unreacted salt could therefore be separated from the end product only with difficulty.

*Example 2*

180 parts of para-aminobenzenesulphonamide (which represents an excess of about 5%) and 150 parts of formaldehyde sodium bisulphite are refluxed for about two hours or longer with about 1500 parts of water. The reaction product is evaporated almost to dryness. Thereupon 2000 parts of absolute alcohol are added, the mixture boiled, and the insoluble residue filtered off. The residue is washed with alcohol and then dried.

Analysis shows that the general formula of the compound, as in Example 1, is $C_7H_{11}O_6N_2S_2Na$, which corresponds to the structural formula

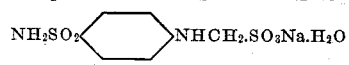

*Example 3*

150 parts of formaldehyde sodium bisulphite and 200 parts of para-aminobenzenesulphonmethylamide are refluxed with 1000 parts of water for about three hours. The resulting reaction liquid is evaporated almost to dryness, diluted with about 2000 parts of absolute alcohol, filtered, subjected to suction on the filter, washed with acetone and then dried at about 80° C. or higher. The analysis of the product shows it to have the general formula $C_8H_{13}O_6N_2S_2Na$, which corresponds to the structural formula

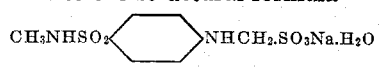

By starting with para-methylaminobenzenesulphonmethylamide, the corresponding end product is obtained.

The compounds may be administered intravenously, subcutaneously, intramuscularly, or orally. For intramuscular injection a 10% aqueous solution may be employed, or higher concentrations if desired; while for intravenous injection a 1-2% aqueous solution is suitable. The compounds may be administered orally in the form of a concentrated solution but preferably in the form of tablets. The dosage may amount to a total of 1 gram per diem, but in view of the non-toxic character of the substances, even larger dosages may be utilized. Tests have indicated that as much as 8 grams per diem can be used for an adult person without visible ill effects.

In place of the formaldehyde sodium bisulphite, other bisulphite compounds capable of combining with the para-aminobenzenesulphonamide compound may be employed, as I have found that desirable antiseptic properties as above described are common to the neutral compounds generally of the para-sulphonamidobenzeneaminomethanesulphonate group.

The new compounds prepared by me are much more soluble in water than the parent substances para-amino-benzene-sulphonamide and its N-substituted products, and can thus be used in relatively high concentration.

It will, of course, be understood that although I have generally indicated my new compounds as containing water of crystallization, my invention contemplates also the compounds freed of such water, and such anhydrous compounds are to be regarded as equivalents of the hydrated compounds defined in the claims.

I claim:

1. A salt of para-methylsulphonamidobenzene-aminomethanesulphonic acid having the following structural formula

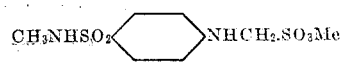

Me being a metallic radical.

2. Alkali metal-methylene-sulphonate of para-methylaminobenzenesulphonamide.

JOHN LEE.